United States Patent [19]

Wheeler et al.

[11] Patent Number: 4,973,089

[45] Date of Patent: Nov. 27, 1990

[54] APPARATUS AND METHOD FOR MAKING OVERLAPPING STRIP JOINTS

[75] Inventors: Michael Wheeler, Chagrin Falls; Lee Kothera, Hiram, both of Ohio

[73] Assignee: Guild International Inc., Bedford, Ohio

[21] Appl. No.: 428,877

[22] Filed: Oct. 30, 1989

[51] Int. Cl.$^5$ .................................... B23K 37/047
[52] U.S. Cl. ........................... 228/170; 228/173.7; 228/5.7; 228/49.4; 72/203; 72/204
[58] Field of Search .......... 228/144, 170, 171, 173.7, 228/5.7, 13, 15.1, 49.1, 49.4; 72/203, 204

[56] References Cited

U.S. PATENT DOCUMENTS

| | | | |
|---|---|---|---|
| 2,782,488 | 2/1957 | Anderson | 228/5.7 |
| 3,239,909 | 3/1966 | Shaffer et al. | |
| 3,298,587 | 1/1967 | Seeloff et al. | 228/5.7 |
| 3,426,952 | 2/1969 | Chew et al. | 228/5.7 |
| 4,586,644 | 5/1986 | Raush et al. | 228/49.1 |
| 4,854,493 | 8/1989 | Fujii et al. | 228/49.4 |

Primary Examiner—Sam Heinrich
Attorney, Agent, or Firm—Renner, Otto, Boisselle & Sklar

[57] ABSTRACT

Strip joining apparatus for joining the ends of two metal strips in overlapping relation includes a shear assembly mounted for indexing movement from a remote location to a first shear position for shearing an end of one of the strips and a second position for shearing an end of antoher strip which is located further from the remote location than the first shear position by a distance corresponding to the desired overlap between the sheared strip ends. Different gauging or stop surfaces are used for locating the shear assembly in the first and second shear positions. Also, the end of the strip that is sheared at the first shear position is moved out of the way during movement of the shear to the second shear position so as not to interfere with the shearing of the other stirp at the second shear position.

25 Claims, 4 Drawing Sheets

APPARATUS AND METHOD FOR MAKING OVERLAPPING STRIP JOINTS

TECHNICAL FIELD OF THE INVENTION

This invention relates generally, as indicated, to an apparatus and method for joining the ends of metal strip material in overlapping relationship to provide continuous strip material for use in continuous strip processing lines and the like.

BACKGROUND OF THE INVENTION

It is generally known from U.S. Pat. No. 3,239,903, the disclosure of which is incorporated herein by reference, to provide a metal strip joining apparatus with a gap control mechanism for controlling the gap or spacing between the adjacent ends of two metal strips prior to welding such ends together. However, it has been found that relatively thin metal strips are more easily welded together if the strip ends are overlapped a controlled small amount prior to welding. Accordingly, there is a need for a metal strip joining apparatus and method that provides for precisely controlling the amount of strip overlap during the strip joining operation.

SUMMARY OF THE INVENTION

With the foregoing in mind, it is a principal object of this invention to provide a strip joining apparatus and method for overlapping the ends of metal strip material a precise small amount prior to joining the strip ends together.

Another object is to provide such an apparatus and method which automatically overlaps the strip ends a precise small amount during shearing of the strip ends prior to welding.

These and other objects of the present invention may be achieved by providing a strip shearing and welding apparatus including in addition to the usual shear and weld assemblies, a gauge mechanism for precisely controlling the location of the shear assembly when indexed to a first shear position in which the trailing end of a previous strip is sheared (trimmed), and a second shear position in which the sheared trailing end of the previous strip is slightly compressed or otherwise displaced out of the way so as not to interfere with the shearing (trimming) of the leading end of a new strip at the second shear position. Accordingly, when the shear assembly is moved out of the way and the weld assembly is indexed to the weld position, the trimmed strip ends will automatically be overlapped a controlled small amount as determined by the gauge mechanism prior to welding the strip ends together.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
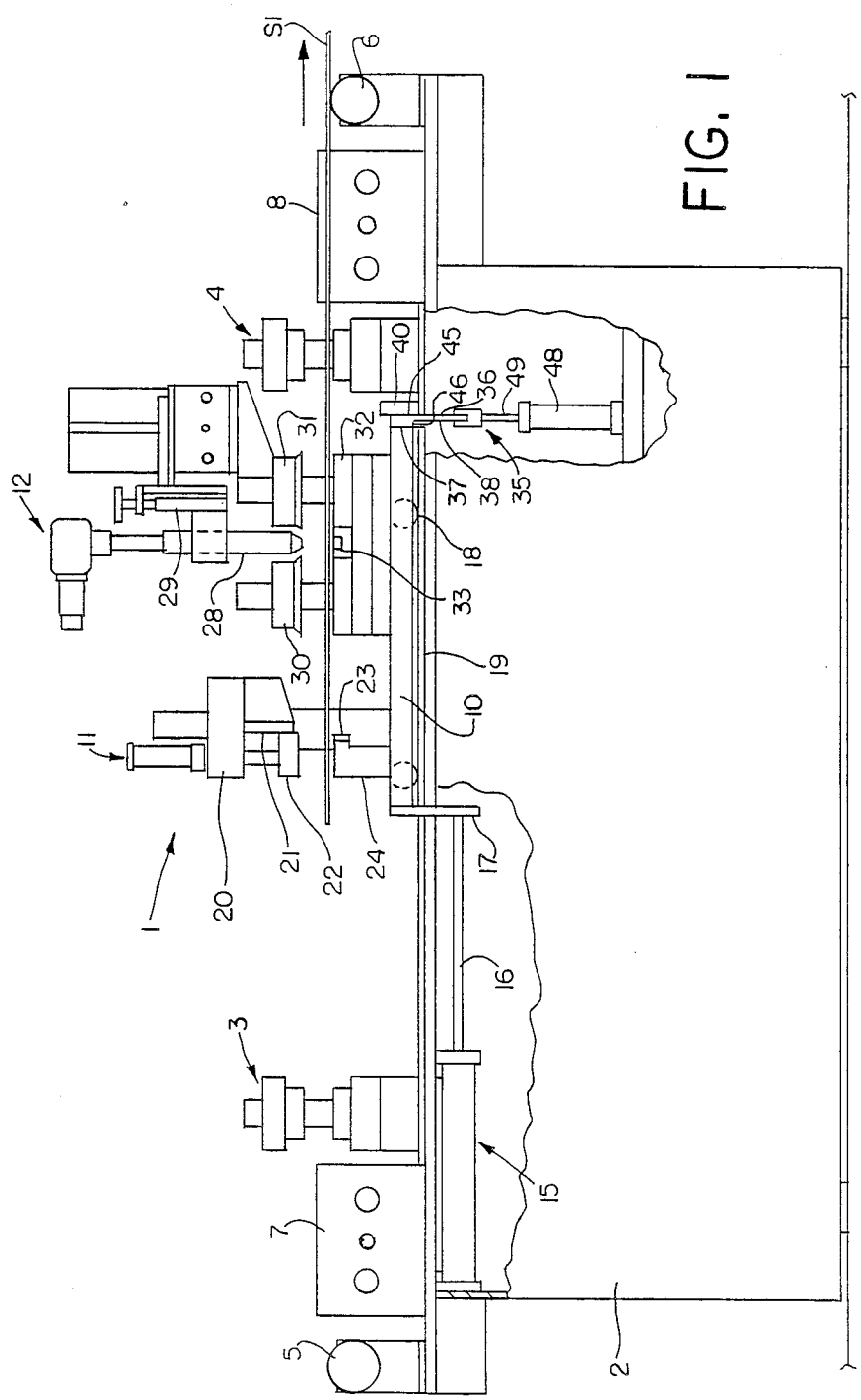
FIG. 1 is a schematic side elevation view, with portions broken away, of a preferred form of strip joining apparatus in accordance with the present invention.

Referring now in detail to the drawings, and initially to FIG. 1, there is schematically shown one form of strip joining apparatus 1 in accordance with this invention including a support stand 2 for supporting entry and exit strip clamps 3, 4, strip support rolls 5, 6, and strip side guides 7, 8 adjacent opposite ends of the support stand. Axially movable between the entry and exit strip clamps 3, 4 is an index table 10 on which are mounted shear and weld assemblies 11, 12 for indexing movement therewith. Movement of the index table 10 may be controlled as by suitably affixing a piston-cylinder assembly 15 to the support stand 2 with its rod 16 connected to a bracket 17 protruding from the index table. Rollers 18 extending below the bottom of the index table 10 support the index table for reciprocal movement along runners 19 intermediate the entry and exit strip clamps 3, 4.

Both the shear and weld assemblies 11, 12 extend generally transversely of the index table 10 but are desirably slightly biased with respect thereto to produce a weld joint that is slightly biased with respect to the longitudinal axis of the apparatus. The shear assembly 11 may be of conventional type including a vertically movable shear head 20 for supporting an upper movable shear blade 21 and hydraulic pressure pad 22 for vertical movement toward and away from a lower shear blade 23 and platen 24 which are relatively fixed with respect to the index table 10. During downward movement of the shear head 20, the hydraulic pressure pad 22 will clamp strip material against the platen 24 while the upper blade 21 continues its downward movement relative to the lower blade 23 to shear the strip therebetween.

The weld assembly 12 may also be of conventional type including a welding torch or other welding apparatus 28 mounted on a weld carriage 29 for movement of the welding apparatus generally transversely of the strip material but on the same bias as the shear assembly 11. The welding apparatus 28 is supported for movement between a pair of weld clamps 30, 31 that are used to clamp the strip ends against a platen (support) 32 on the index table 10 during the welding operation. Between the weld clamps 30, 31 is a weld back-up bar 33 for supporting the strip ends during welding.

It will of course be understood that various types of welding torches may be employed such as metallic arc using a consumable electrode, a tungsten arc using a non-consumable electrode, or a tungsten arc using side wire feed. Also, the torch may be mounted on an air slide automatically to elevate the torch at the end of a weld traverse so that the apparatus can be reset immediately. Moreover, vertical and angular torch adjustment may be provided as desired. Resistance welding with rotary electrodes can also be employed.

The strip joining apparatus 1 of the present invention is primarily intended for use in welding together the ends of relatively thin metal strip material having a thickness for example, of from approximately 0.006 inch to 0.060 inch. It has been found that these thinner strips are more easily welded together if the strip ends are overlapped a controlled small amount before welding. To that end, the apparatus 1 is provided with a gauging mechanism 35 that may include an inverted gap shim 36 having two or more gauging surfaces 37, 38 of different thicknesses for insertion between the upstream end of the index table 10 (i.e. the end nearest the exit end of the apparatus 1) and a gap block 40 fixed with respect to the support stand 2.

The inverted gap shim 36 shown has a vertically extending planar surface 45 on the side facing the gap block 40 and a horizontal shoulder 46 intermediate the length of the other side to provide the two gauging surfaces 37, 38 of different thicknesses, with the thickest gauging surface being at the upper end. Shim 36 may be raised and lowered between the gap block 40 and index table 10 by actuation of a piston-cylinder assembly 48 mounted on the support stand 2 with its rod 49 suitably connected to the shim 36. The thicker gauging surface 37 is used to locate the index table 10 at a first shearing position for shearing the trailing end of the previous strip S1, whereas the thinner gauging surface 38 is used to locate the index table 10 at a second shearing position slightly upstream of the first shearing position for shearing the leading end of a new strip S2 to obtain the desired strip overlap during indexing movement of the index table 10 to the welding position as described hereafter.

Figure 2:
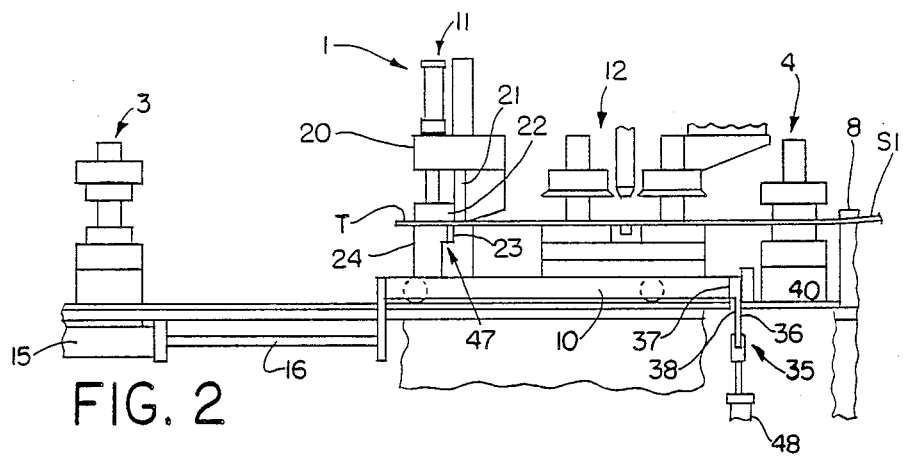
FIGS. 2-7 are fragmentary side elevation views of the strip joining apparatus of FIG. 1 showing the various sequences of operation.

Such apparatus may of course be used any time it becomes necessary to remove a damaged section from a strip and rejoin the strip ends together, or to join the leading end of a new strip to the trailing end of a previous strip. In operation, when a previous strip S1, which is being fed through the strip joining apparatus 1 to a strip processing mill or the like (not shown), nears the end of its length, movement of the previous strip S1 through the apparatus 1 is stopped with its trailing end T protruding through the weld assembly 12 and shear assembly 11 as schematically shown in FIG. 2. Next the exit side guides 8 are closed to center the previous strip S1 with respect to the shear and weld assemblies 11, 12 and the exit strip clamp 4 is actuated to clamp the previous strip S1 in place as further schematically shown in FIG. 2. Then, if the gauging mechanism 35 is not already in the correct position, the piston-cylinder assembly 48 is actuated to locate the thicker gauging surface 37 of the shim 36 between the upstream end of the index table 10 and fixed stop 40 and the index table 10 is indexed into engagement with the thicker gauging surface 37 as further shown in FIG. 2. This automatically locates the shear assembly 11 at a first shear position where the trailing end T of the previous strip S1 is accurately trimmed upon lowering the movable shear blade 21. The trailing end of the previous strip S1 is held in place during such trimming operation by the pressure pad 22 as previously described.

Figure 3:
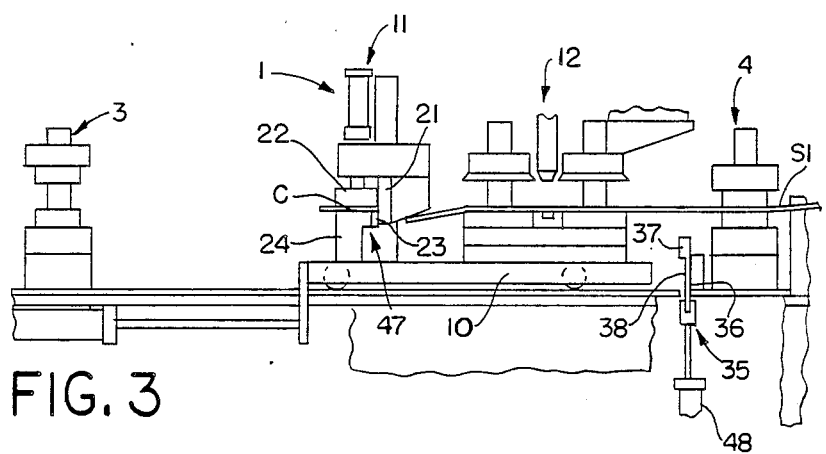
Figure 4:
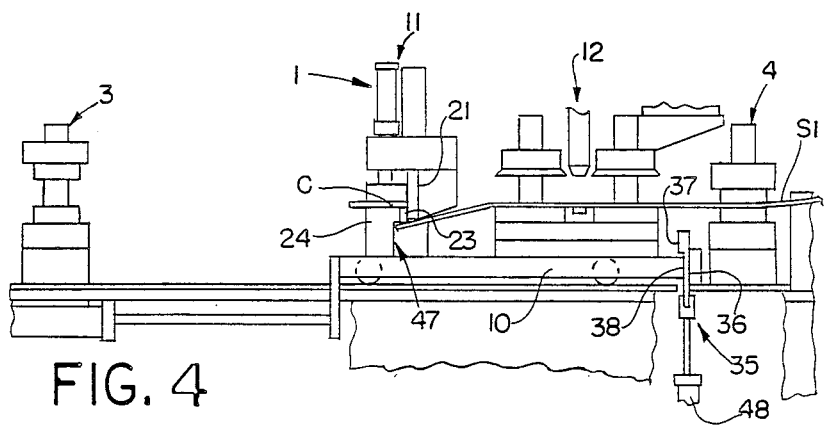

Next the index table 10 is indexed away from the shim 36 (i.e. toward the entry end of the apparatus 1 as seen in FIG. 3) to permit the shim 36 to be elevated to bring the thinner gauging surface 38 into alignment with the index table. Then the index table 10 is indexed back to the right until the leading end of the index table engages the thinner gauging surface 38 as schematically shown in FIG. 4. This locates the shear assembly 11 at a second shearing position which is closer to the exit end of the apparatus 1 than the first shearing position by an amount corresponding to the difference in thickness between the two gauging surfaces 37, 38.

During such return movement of the index table 10 to the second shearing position shown in FIG. 4, the previous strip S1 remains clamped by the exit clamp 4. Accordingly, the trimmed end of the previous strip S1 must be slightly compressed or otherwise displaced so as not to be in the way during the subsequent shearing of the leading end of the new strip S2. Preferably, the lower shear blade 23 has a relatively short height (for example, approximately one inch), with a relieved or open area 47 below the lower shear blade for receipt of the trailing end of the previous strip to eliminate the need for having to compress the trimmed end of the previous strip S1 when the index table 10 is indexed from the retracted position shown in FIG. 3 to the second shearing position up against the thinner gauging surface 38 as shown in FIG. 4. During such indexing movement, the upper movable shear blade 21 may be left down to hold the trailing end of the previous strip down and guide it into the open area 47 below the lower shear blade 23 as further schematically shown in FIG. 4.

Figure 8:
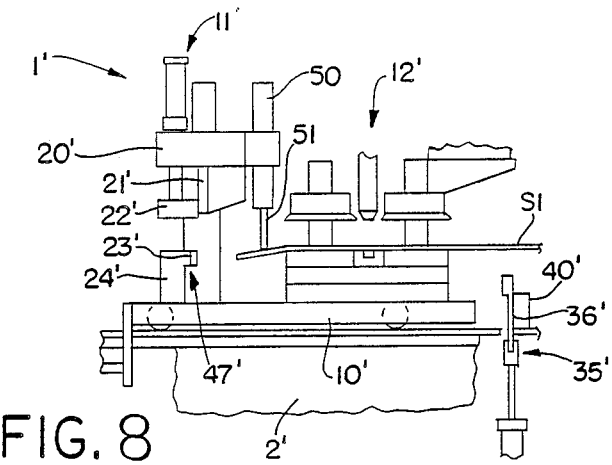
FIGS. 8 and 9 are fragmentary side elevation views of a slightly modified form of strip joining apparatus in accordance with this invention.
Figure 9:
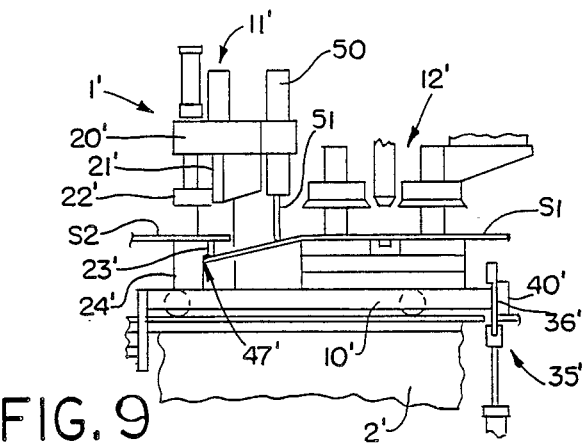

Alternatively, an auxiliary cylinder 50 may be provided on the shear assembly 11' for use in deflecting the trimmed end of the previous strip S1 downwardly by extending its piston rod 51 into engagement with such trimmed end to guide it into the open area 47' below the lower shear blade 23' during indexing movement of the index table 10' from the retracted position shown in FIG. 8 to the second shearing position shown in FIG. 9.

Providing an open area 47 or 47' below the lower shear blade 23 or 23' has the advantage that when the index table 10 or 10' is moved from the retracted position shown in FIGS. 3 and 8 to the second shearing position shown in FIGS. 4 and 9, the trimmed end of the previous strip S1 will extend beneath the lower shear blade 23 or 23' to the extent of the final desired strip overlap (which in the usual case is desirably approximately one quarter inch to one inch). This eliminates the need for having to compress the trimmed end of the previous strip S1 during such indexing movement as aforesaid, and allows the movable shear blade 23 or piston rod 51 to be retracted once the shear assembly 11 or 11' is in the second shear position. Otherwise the details of construction and operation of the strip joining apparatus 1' shown in FIGS. 8 and 9 are substantially the same as those shown in FIGS. 1–7 and accordingly the same reference numbers followed by a prime symbol are used to designate like parts.

Figure 5:
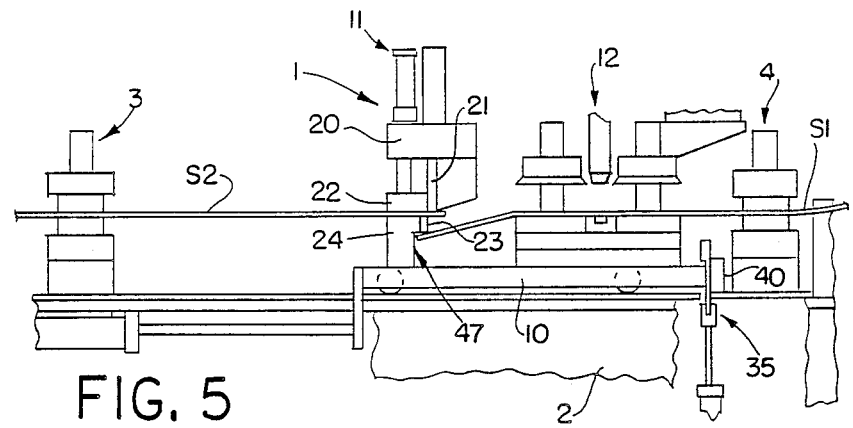

The leading end of the new strip S2 is fed into the entry end of apparatus 1 after the trailing end of the previous strip S1 is sheared, the index table 10 is indexed to the second shearing position, and the movable shear head 20 is raised to its uppermost position shown in FIG. 1. The scrap piece C (shown in FIGS. 3 and 4) that was trimmed from the trailing end of the previous strip S1 is free to be removed any time upon raising the movable shear head 20 after such trimming operation. The new strip S2 is stopped with its leading end projecting through the shear assembly 11 and over the top of the trimmed end of the previous strip S1 as schematically shown in FIG. 5. At that time the entry side guides 7 (see FIG. 1) may be closed to center the new strip S2 with respect to the previous strip S1. Then the entry strip clamp 3 is activated to clamp the new strip S2 in place and the shear assembly 11 is activated to make the desired trim cut on the leading end of the new strip S2 as schematically shown in FIG. 5.

Figure 6:
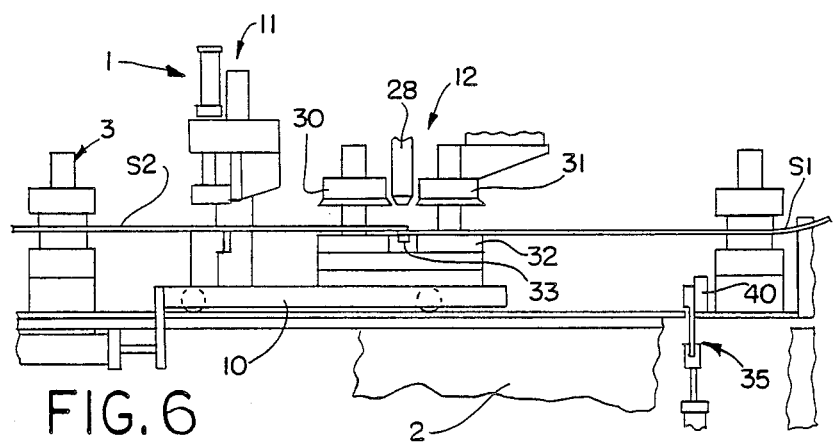

While the strips S1 and S2 still remain clamped by the exit and entry clamps 4, 3, the index table 10 is indexed from the second shearing position shown in FIG. 5 to the weld position shown in FIG. 6. During such indexing movement of the index table 10, the trimmed end of the previous strip S1 is raised up against the bottom side of the trimmed end of the new strip S2 by the platen 32, and the two trimmed strip ends are automatically overlapped a controlled small amount equal to the difference in thickness between the two gauging surfaces 37, 38 (which in the usual case is approximately one quarter inch to one inch as aforesaid).

In the embodiments shown, the shim 36 includes two gauging surfaces 37, 38. However, it will be appreciated that additional gauging surfaces of different thicknesses could be provided on a single shim 36 for use in providing different amounts of overlap of the trimmed strip ends depending on which gauging surfaces are used to locate the index table at the respective first and second shear positions. In each case, the thickness of the gauging surface used to locate the index table at the first shear position must be greater than the thickness of the gauging surface used to locate the index table at the second shear position or otherwise the trimmed strip ends will not be overlapped as desired when the index table is indexed to the welding position. Alternatively, a single gauging surface of uniform thickness could be employed with the thickness of the gauging surface being equal to the amount of overlap desired between the trimmed strip ends. In that event, the gauging surface would be inserted between the index table 10 and fixed stop 40 to locate the index table in the first shear position and then removed from between such surfaces to permit the index table to be butted directly against the fixed stop 40 to locate the index table in the second shear position.

Figure 7:
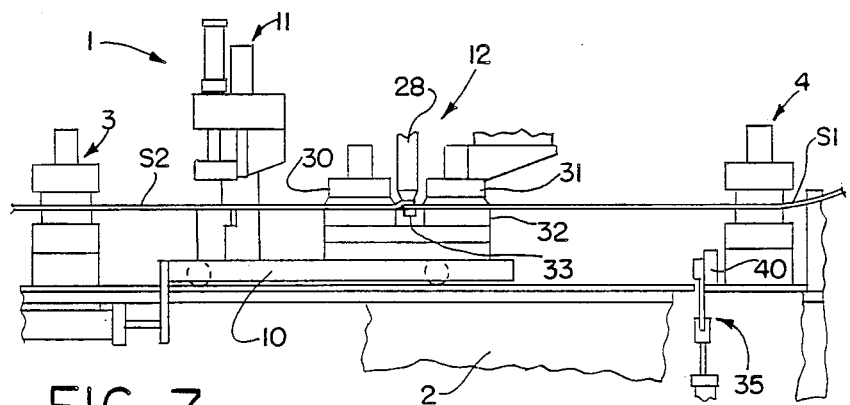

When the index table 10 is in the weld position with the weld back-up bar 33 disposed under the overlapped ends of the two strips S1 and S2 as schematically shown in FIG. 6, the two weld clamps 30, 31 are actuated properly to clamp the strip ends in position and the welding apparatus 28 is lowered for welding of the overlapping strip ends together during traversal by the welding apparatus as schematically shown in FIG. 7. Following the welding operation, the weld clamps 30, 31, strips clamps 2, 3 and side guides 7, 8 are opened to permit resumption of the strip movement through the strip joining apparatus 1 until such time as the strip joining process is repeated once again.

From the foregoing, it will now be apparent that the apparatus and method of the present invention provide a relatively simple and reliable way of overlapping the ends of two relatively thin metal strips a controlled small amount prior to welding the strip ends together.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. Strip joining apparatus comprising shear means and weld means for respectively shearing and welding the ends of two metal strips in overlapping relation, clamp means operative to hold the strips against movement during such shearing and welding of the strip ends together, means operative accurately to shift the position of said shear means toward one of the strip ends after shearing of such one strip end and before shearing of the other strip end to provide a predetermined amount of overlap of the strip ends after shearing both strip ends, means for moving the one strip end out of the way of the shear means during shearing of the other strip end, and means for positioning said weld means in line with the sheared strip ends for welding the sheared strip ends together in overlapping relation.

2. The apparatus of claim 1 wherein said means for shifting the position of said shear means comprises movable support means for said shear means, and stop means engageable by said support means for limiting the movement of said support means toward said one strip end after shearing of said one strip end to locate said shear means for shearing the other strip end.

3. The apparatus of claim 2 wherein said stop means comprises gauge means movable transversely of said movable support means.

4. The apparatus of claim 3 wherein said gauge means includes plural gauging surfaces having different thicknesses for controlling the amount of overlap between the sheared strip ends.

5. The apparatus of claim 3 further comprising additional stop means providing a back stop for said gauge means when said gauge means is in the line of movement of said support means.

6. The apparatus of claim 3 wherein said gauge means includes a first gauging surface engageable by said support means to locate said shear means at a first shear position for shearing said one strip end, and a second gauging surface engageable by said support means for locating said shear means at a second shear position for shearing the other strip end, said second gauging surface having a thickness which is less than the thickness of said first gauging surface by an amount substantially corresponding to the desired amount of overlap of the welded strip ends.

7. The apparatus of claim 6 wherein said gauge means comprises a shim supported by a piston-cylinder assembly for transverse movement relative to said support means, said first gauging surface being on an axial outer end portion of said shim, and said second gauging surface being on a portion of said shim axially inwardly of said first gauging surface.

8. The apparatus of claim 2 wherein said weld means is also mounted on said support means in axially spaced relation from said shear means for movement of said shear means and weld means as a unit.

9. The apparatus of claim 8 wherein the one strip is clamped adjacent an exit end of said apparatus, and the other strip is clamped adjacent an entry end of said apparatus.

10. The apparatus of claim 2 wherein said shear means includes a lower shear blade that is fixed relative to said support means and an upper shear blade that is vertically movable relative to said lower shear blade, and said means for moving the one strip end out of the way of said shear means during shearing of the other strip end comprises means for deflecting the one strip end downwardly below an upper surface of said lower shear blade during shifting of said support means toward the one strip end.

11. The apparatus of claim 10 wherein said means for deflecting the one strip end downwardly comprises rod means movable into engagement with an upper surface of the one strip end.

12. The apparatus of claim 11 further comprising a piston-cylinder assembly on said support means for actuating said rod means.

13. The apparatus of claim 10 wherein said means for deflecting the one strip end downwardly comprises said upper shear blade which is left down after shearing the one strip end.

14. The apparatus of claim 10 wherein said means for deflecting the one strip end downwardly is operative to guide the one strip end below a bottom edge of said lower shear blade during movement of said support means into engagement with said stop means to trap the one strip end in an open area beneath said lower shear blade during shearing of the other strip end.

15. The apparatus of claim 14 wherein said open area has an axial depth at least as great as the distance said shear means is shifted toward the one strip end after shearing of the one strip end to permit the one strip end to be received within said open area beneath said lower shear blade without having to compress the one strip end during shearing of the other strip end.

16. In a strip joining apparatus for joining the ends of two metal strips in overlapping relation, shear means for shearing such strip ends, means mounting said shear means for movement from a remote location first to a first shear position for shearing one of said strip ends and then to a second shear position for shearing the other strip end, said second shear position being further from said remote location than said first shear position by a distance corresponding to the desired overlap between the sheared strip ends, and means for accurately locating said shear means in said first and second shear positions comprising a first gauging surface movable into and out of the line of movement of said support means for locating said shear means at said first shear position, and a second gauging surface for locating said shear means at said second shear position when said first gauging surface is moved out of such line of movement of said support means.

17. The apparatus of claim 16 wherein said gauging surfaces are supported by a common member transversely movable into and out of the line of movement of said support means, said second gauging surface having a thickness which is less than said first gauging surface by an amount substantially corresponding to the desired overlap of the sheared strip ends.

18. In a strip joining apparatus for joining the ends of two metal strips in overlapping relation, clamp means operative to hold the strips against movement, shear means for shearing such strip ends, means operative accurately to shift the position of said shear means toward one of the strip ends after shearing of such one strip end and before shearing of the other strip end to provide a predetermined amount of overlap of the strip ends after shearing both strip ends, means for moving the one strip end out of the way of the shear means during shearing of the other strip end, and means for welding the sheared strip ends together in overlapping relation.

19. A method of joining two metal strip ends together in overlapping relation comprising the steps of indexing a shear from a remote location to a first shear position, shearing an end of a first strip at such first shear position, indexing the shear to a second shear position which is further removed from the remote location a predetermined amount corresponding to the desired amount of overlap of the sheared strip ends, shearing an end of a second strip at such second shear position, moving the sheared end of the first strip out of the way so as not to interfere with the shearing of the end of the second strip at such second shear position, indexing the shear back toward the remote location to a welding position in which the sheared ends of the first and second strips are clamped together in overlapping relation, and welding the strip ends together in such overlapping relation.

20. The method of claim 19 wherein the shear includes an upper movable shear member that is left closed after shearing the first strip to deflect the sheared end of the first strip downwardly into an open area below a lower shear member during indexing of the shear from the first shear position to the second shear position so that the sheared end of the first strip does not interfere with the shearing of the end of the second strip at the second shear position.

21. The method of claim 19 wherein a rod is used to deflect the sheared end of the first strip downwardly during indexing movement of the shear from the first shear position to the second shear position so the sheared end of the first strip does not interfere with the shearing of the end of the second strip at the second shearing position.

22. The method of claim 19 wherein the shear includes a lower shear blade and an upper shear blade vertically movable relative to the lower shear blade, and the sheared end of the first strip is deflected downwardly into an open area below the lower shear blade during indexing movement of the shear from the first shear position to the second shear position so the sheared end of the first strip does not interfere with the shearing of the end of the second strip at the second shear position.

23. The method of claim 19 wherein a movable support is provided for supporting the shear for movement from the remote location first to the first shear position and then to the second shear position and return to the remote location.

24. The method of claim 23 further comprising the steps of inserting a first gauging surface in the line of movement of the support means from the remote location toward the first shear position to locate the shear at the first shear position, and after shearing of the end of the first strip at the first shear position, removing the first gauging surface from the line of movement of the support means to permit further movement of the support means into engagement with another surface which locates the shear at the second shear position.

25. The method of claim 24 wherein such another surface comprises a second gauging surface having a thickness which is less than the first gauging surface by an amount substantially corresponding to the final desired amount of overlap of the sheared strip ends.

* * * * *